US009251132B2

(12) United States Patent
Guo et al.

(10) Patent No.: US 9,251,132 B2
(45) Date of Patent: Feb. 2, 2016

(54) METHOD AND APPARATUS FOR TAGGING A DOCUMENT (75) Inventors: HongLei Guo, Beijing (CN); Zhi Li Guo, Beijing (CN); Zong Su, Beijing (CN); Xiao Xun Zhang, Beijing (CN); Hui Jia Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 13/030,309

(22) Filed: Feb. 18, 2011

(65) Prior Publication Data

US 2011/0209043 A1   Aug. 25, 2011

(30) Foreign Application Priority Data

Feb. 21, 2010   (CN) .......................... 2010 1 0112221

(51) Int. Cl.
*G06F 17/27*   (2006.01)
*G06F 17/22*   (2006.01)

(52) U.S. Cl.
CPC ...................................... *G06F 17/27* (2013.01)

(58) Field of Classification Search
CPC ............ G06F 17/2241; G06F 17/2785; G06F 17/30014; G06F 17/30604; G06F 17/30616; G06F 17/30864; G06F 17/22; G06F 17/27
USPC ......... 715/205, 206, 208, 221, 224, 230–232, 715/254
See application file for complete search history.

(56) References Cited

U.S. PATENT DOCUMENTS

| 6,405,226 | B1 * | 6/2002 | Alpert et al. ................... 715/206 |
| 7,403,938 | B2 * | 7/2008 | Harrison et al. |
| 7,523,085 | B2 * | 4/2009 | Nigam et al. .................... 706/55 |
| 7,558,769 | B2 | 7/2009 | Scott |
| 7,620,888 | B2 * | 11/2009 | Hirst .............................. 715/234 |
| 8,280,885 | B2 * | 10/2012 | Cardie et al. ................... 707/737 |
| 8,630,972 | B2 * | 1/2014 | Gamon et al. ................... 706/58 |
| 2005/0125216 | A1 | 6/2005 | Chitrapura |
| 2008/0086680 | A1 * | 4/2008 | Beckman ....................... 715/230 |
| 2008/0104506 | A1 * | 5/2008 | Farzindar ....................... 715/254 |
| 2008/0133488 | A1 | 6/2008 | Bandaru |
| 2008/0154883 | A1 * | 6/2008 | Chowdhury et al. .............. 707/5 |
| 2008/0201348 | A1 | 8/2008 | Edmonds |
| 2009/0019356 | A1 * | 1/2009 | Deyab et al. ................... 715/231 |
| 2009/0048823 | A1 | 2/2009 | Liu |

(Continued)

FOREIGN PATENT DOCUMENTS

| CN | 101292238 A | 10/2008 |
| CN | 101408883 A | 4/2009 |
| WO | WO-2008083504 | 7/2008 |

OTHER PUBLICATIONS

Zhang et al., "Focused Named Entity Recognition using Machine Learning," SIGIR '04, 2004.

(Continued)

*Primary Examiner* — Wilson Tsui
(74) *Attorney, Agent, or Firm* — Cantor Colburn LLP (57) ABSTRACT

A document tagging method and apparatus. According to the method, a focused entity relevant to a basic document and a sentiment polarity of comments on the focused entity are acquired, and then a tag is generated on the basic document from the focused entity and the corresponding sentiment polarity. The present invention can tag the basic document with an opinion on the relevant focused entity and thus facilitate knowledge of the opinion on a relevant entity.

19 Claims, 11 Drawing Sheets

(56) References Cited

U.S. PATENT DOCUMENTS

2009/0112892 A1  4/2009  Cardie
2009/0193328 A1  7/2009  Reis
2009/0265307 A1  10/2009 Reisman
2011/0213655 A1* 9/2011  Henkin et al. ............. 705/14.49

OTHER PUBLICATIONS

Ku et al., "Opinion extraction. summarization and tracking in news and blog Corpora," AAAI, 2006.

Liu et al., "Opinion Observer: Analyzing and Comparing Opinions on the Web," WWW, 2005.

Guo et al., "Product Feature Categorization with Multilevel Latent Semantic Association." CIKM '09, 2009

Chen et al; Abstract "Research on Sentiment Classification of BBS Reviews Based on Identifying Words with Polarity", BBS, Jul. 31, 2009. 1 page.

The Patent Office of the State Intellectual Property Office of the People's Republic of China, Office Action for Appl. No. 201010112221.X, mailed Jan. 18, 2013; 8 pages.

* cited by examiner

Unusual Heavy Snow Falls in Tai Zhou City Zhe Jiang Province
http://www.sina.com.cn.23:19, January 06, 2010       402

Reported (by Hong Zhao). The first dancing snow in 2010 comes to us. "It is snowing!" Those kids may be the happiest ones making snowmen, throwing snowballs, picking up snow with their hands and tasting snow with their tongues. The snow has become their nicest memory of winter.

Cold air arrived with wind and rain after the first working day after New Year 2010's Day. However, we have been offered such an unexpected gift from Heaven. Such city-wide snow has not been experienced in many years. The snow disappeared after sudden flashing at a corner just like a piquant and shy kid.

The reporter has been informed by the weather bureau that the snow actually had came in the evening of the day before yesterday with light snowing in the south and moderate to heavy snowing in the north. Particularly, Xian Ju suffered the severest snow and the thickness of its accumulated snow reached 5 centimeters by 8:00 in the morning of yesterday, and the thickness of accumulated snow reached 4 centimeters in Tian Tai and San Men. Snow stopped in Jiao Jiang around the noon of yesterday and throughout the city until the afternoon of yesterday.

The snow resulted from strong cold air, and the weather bureau published a low temperature forecast calling for attention of departments concerned. The lowest temperature in the mornings of yesterday and today is forecasted: -1 to -3°C and freezing in the north; and around 0°C and thin ice in the other regions. The highest temperature in the daytime: 6 to 8°C. It is cloudy today and turns overcast and sometimes light rain or rain mingled with the snow in the evening. It will be cloudy to sunny, and the temperature will rise due to the sunshine.

The snow brings a joy to us and also benefits crops. The heavy snow promise a good harvest. Nitrides contained in the thawing snow are introduced into the soil to offer excellent manures, and pests may be winterkilled at the low temperature.

Unusual Heavy Snow Falls in Tai Zhou City Zhe Jiang Province
http://www.sina.com.cn.23:19, January 06, 2010

Reported (by Hong Zhao). The first dancing snow in 2010 comes to us. "It is snowing!" Those kids may be the happiest ones making snowmen, throwing snowballs, picking up snow with their hands and tasting snow with their tongues. The snow has become their nicest memory of winter.

Cold air arrived with wind and rain after the first working day after New Year 2010's Day. However, we have been offered such an unexpected gift from Heaven. Such city-wide snow has not been experienced in many years. The snow disappeared after sudden flashing at a corner just like a piquant and shy kid.

The reporter has been informed by the weather bureau that the snow actually had came in the evening of the day before yesterday with light snowing in the south and moderate to heavy snowing in the north. Particularly, Xian Ju suffered the severest snow and the thickness of its accumulated snow reached 5 centimeters by 8:00 in the morning of yesterday, and the thickness of accumulated snow reached 4 centimeters in Tian Tai and San Men. Snow stopped in Jiao Jiang around the noon of yesterday and throughout the city until the afternoon of yesterday.

The snow resulted from strong cold air, and the weather bureau published a low temperature forecast calling for attention of departments concerned. The lowest temperature in the mornings of yesterday and today is forecasted: -1 to -3°C and freezing in the north; and around 0°C and thin ice in the other regions. The highest temperature in the daytime: 6 to 8°C. It is cloudy today and turns overcast and sometimes light rain or rain mingled with the snow in the evening. It will be cloudy to sunny, and the temperature will rise due to the sunshine.

The snow brings a joy to us and also benefits crops. The heavy snow promise a good harvest. Nitrides contained in the thawing snow are introduced into the soil to offer excellent manures, and pests may be winterkilled at the low temperature.

Http://blog.163.com/****/2009101295811305/ — 1004

Entity 1: Heavy snow on New Year's Day, Cold Wave

Positive comments (20)
Heavy snow on New Year's Day. We can throw snowballs. Kids are very happy.
Another heavy snow on New Year's Day in Beijing. The heavy snow promise a good harvest.
********

Negative comments (72)
Heavy snow on New Year's Day. Awful traffic.
The first heavy snow on New Year's Day. Many people planning for an outing on New Year's Day feel inconvenient.
********                                          1002

Entity 2: Power System

Positive comments (62)
The State Grid deals promptly with the unusual heavy snow to go all out for a power supply
Power systems in North China are in stable operation despite the cold wave on New Year's Day
Why are the power systems normal all the time despite heavy snow in winter of North China?

Negative comments (30)
A limited power supply poses another disaster in addition to the snow.
The first snow in 2010 exacerbates insufficiency of a power supply.
The outage of power is discouraging in such a cold day.

Entity 3: Airport, Flights

Positive comments (20)
Various emergency actions are taken promptly at Phoenix Airport including communication with respective airways regarding rooms and boards of delayed passengers, timely publishing of latest flight information and appropriate arrangements of passengers delayed or with their flights cancelled to thereby avoid a large number of passengers from remaining.
Flights are not influenced due to the heavy snow at Yan Tai Airport.

Negative comments (5)
Remaining passengers sleep on the floor at Capital Airport.
Tian Jin suffers the snow severest in last 57 years. My granny has remained for two days at Tian Jin Airport.

Entity 4: Taizhou

Positive comments (6)
Reported from Tai Zhou: The first dancing snow in 2010 come Negative comments (3)
There is a daily shortage of approximately 200 thousand kilowatts of power in Tai Zhou, and this insufficiency of power of electrical sources results from a shortage of power over the provincial grid.

METHOD AND APPARATUS FOR TAGGING A DOCUMENT

CROSS-REFERENCE TO RELATED APPLICATION

This application claims priority under 35 U.S.C. §119 from Chinese Patent Application No. 201010112221.X filed Feb. 21, 2010, the entire contents of which are incorporated herein by reference.

BACKGROUND OF THE INVENTION

1. Field of the Invention

The present invention generally relates to information processing, particularly to document processing and more particularly to a document tagging method and apparatus.

2. Description of Related Art

In the age of Internet, a large amount of information over the Internet greatly facilitates knowledge of people about information on various aspects, including opinions on various entities of interest, referred to as focused entities ("entity" in this application includes a subject which is an object or an event). For example, an opinion on an entity includes a positive opinion, a negative opinion, etc. An attribute of whether an opinion is positive or negative is referred to as a "sentiment polarity". A technology of deriving a sentiment polarity on an entity is referred to as a sentiment analysis technology. Currently, there are various sentiment analysis technologies available. For example, US 2009193328 describes an "Aspect-Based Sentiment Summarization," US 20080154883 describes a "System and Method for Evaluating Sentiment," US 20050125216 describes a method of "Extracting and Grouping Opinions from Text Documents," WO 2008083504 describes a "Method and System for Information Discovery and Text Analysis," US 20090048823 describes a "System and Methods for Opinion Mining," and US 20080133488 describes a "Method and System for Analyzing User-Generated Content."

However, in analyzing a sentiment on specific contents (a keyword, an entity, etc.), only a fragmentary knowledge about the polarity of the sentiment is derived. Thus, such analysis obstructs people from getting a full insight of an article or a subject. Particularly, since respective entities and thus opinions on them are isolated, it is impossible to reflect the relationship among the respective entities. Furthermore, an entity and a source from which the entity is fetched (e.g., a document, etc.) are isolated, while in fact, associations between entities and between an entity and its source are important in gaining helpful information.

SUMMARY OF THE INVENTION

According to an aspect of the invention, there is provided a document tagging method including: acquiring a focused entity relevant to a basic document; acquiring a sentiment polarity of comments on the focused entity; and generating a tag on the basic document from the focused entity and the corresponding sentiment polarity.

According to another aspect of the invention, there is provided a document tagging apparatus including: a focused entity acquisition means configured to acquire a focused entity relevant to a basic document; a sentiment polarity acquisition means configured to acquire a sentiment polarity of comments on the focused entity; and a tag generation means configured to generate a tag on the basic document from the focused entity and the corresponding sentiment polarity.

Furthermore, another aspect of the invention provides a computer program product which can be executed on a computer to implement the foregoing method or apparatus and a computer readable medium in or over which the computer program is stored or transmitted.

According to the foregoing aspects, a basic document can be tagged with opinions on relevant focused entities to thereby facilitate knowledge of people about the opinions on the relevant focused entities. Particularly, the focused entities originating from the basic document and the opinions on the focused entities being tagged on the basic document can facilitate comprehensive insights and opinions of people on contents (e.g., an event, etc.) reflected in the basic document because this tagging manner reflects sufficiently associations between the focused entities and the basic document and between the respective focused entities.

BRIEF DESCRIPTION OF THE DRAWINGS

FIG. 10 is another example of a document tagged according to the further embodiment of the method of the invention.

DETAILED DESCRIPTION OF THE PREFERRED EMBODIMENTS

The present invention provides a technology of facilitating knowledge about an opinion on a relevant entity and particularly provides a technology of tagging an opinion of a relevant entity into a relevant document. Exemplary embodiments of the invention will be described hereinafter in connection with the drawings. For clarity and conciseness, not all of features of the embodiments will be described in the specification. However it shall be appreciated that numerous decisions specific to specific embodiments shall be made during development of the specific embodiment to attain a specific object of the developer, for example, to comply with those limitative conditions relevant to a system or a service, which can vary with different embodiments. It shall further be appreciated that although a development task can be complex and time consuming, such a development task can be merely a routing task for those skilled in the art benefited from this disclosure.

It shall further be noted here that only those apparatus structures and/or process steps closely relevant to a solution of the invention have been illustrated in the drawings from which other details of less relevance to the invention have been omitted so as not to obscure the invention due to unnecessary details.

Figure 1:
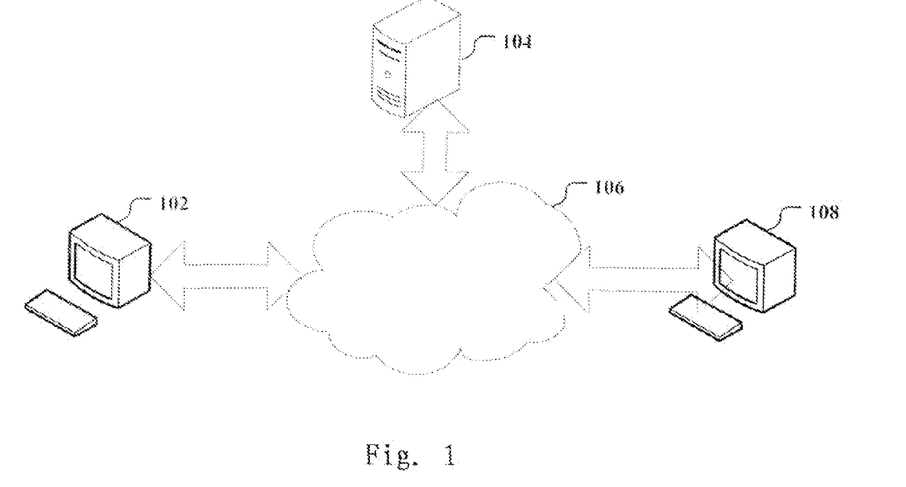
FIG. 1 is a schematic diagram of an example of a network system in which respective embodiments of the invention can be realized.

Reference is firstly made to FIG. 1 illustrating a schematic diagram of an example of a network system in which respective embodiments of the invention can be realized. As illustrated in FIG. 1, a first terminal 102 and a second terminal 108 are connected to a server 104 over a network 106. A user can provide contents to or retrieve, browse or download the contents from the server 104 and analyze and process the contents through the first terminal 102 and/or the second terminal 108 over the network 106. The server 104 can store contents provided from a user through the terminal and/or from a service provider and host various websites, e.g., a database service, a news website, a BBS forum, a blog, etc. For example, the server 104 can be a server of a news website, and a user, e.g., a user of the second terminal 108, etc., can browse a piece of news over the a news website and add comments over the network or can comments on a piece of relevant news over another website, e.g., a BBS forum, a blog, etc., while another user, e.g., a user of the first terminal 102, etc., can view the news, the comments, etc., over the network. On a terminal in which a relevant embodiment of the invention is realized, e.g., the first terminal 102, etc., a user can tag a basic document, e.g., a news article, etc. according to the embodiment of the invention, to facilitate knowledge of another user about an opinion on something of interest to him or her.

The first terminal 102, the server 104 and the second terminal 108 can be the same or different information processing apparatus or dedicated or general-purpose computing apparatus in which respective operating systems or application software (and/or firmware) can be installed to enable them to operate respectively as a user terminal or a server.

Furthermore, although only one server and two user terminals are illustrated in FIG. 1 for conciseness, it is apparent that a plurality of user terminals and servers exist over the network which can include various networks including the Internet, an intranet, a local area network, etc.

Figure 2:
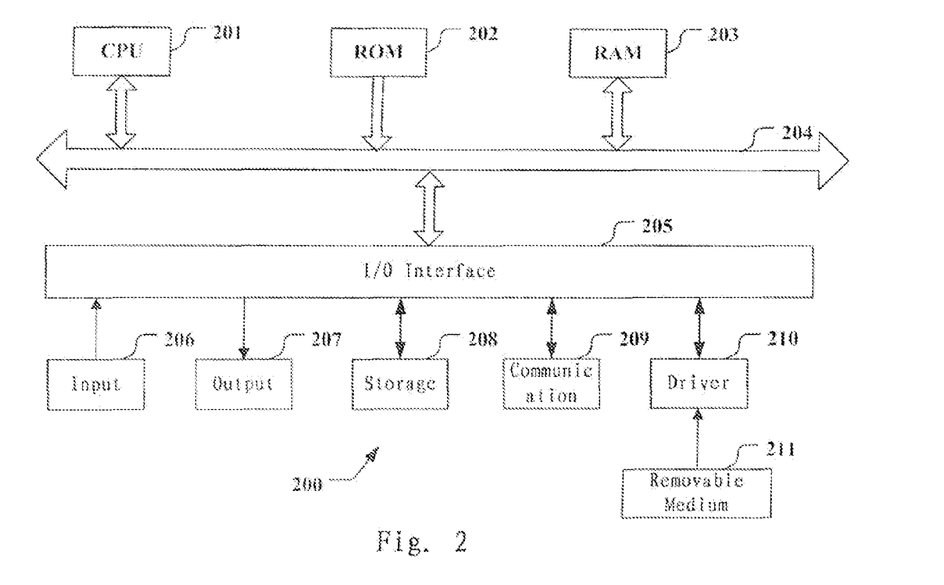
FIG. 2 is a schematic diagram of an example of a computing apparatus in which respective embodiments of the invention can be embodied.

FIG. 2 is a schematic diagram of an example of a computing apparatus 200 (e.g., operating as the first terminal 102 illustrated in FIG. 1) in which respective embodiments of the invention can be realized.

In FIG. 2, a Central Processing Unit (CPU) 201 performs various processes based on programs stored in a Read Only Memory (ROM) 202 or loaded from a storage portion 208 into a Random Access Memory (RAM) 203. Data required for the CPU 201 to perform various processes, etc., can also be stored in the RAM 203 as required.

The CPU 201, the ROM 202 and the RAM 203 are connected to each other via a bus 204 to which an input/output interface 205 is also connected.

The following components are connected to the input/output interface 205: an input portion 206 including a keyboard, a mouse, etc., an output portion 207 including a display (e.g., a Cathode Ray Tube (CRT) display, a Liquid Crystal Display (LCD), etc.), a speaker, etc., a storage portion 208 including a hard disk, etc., and a communication portion 209 including a network interface card, e.g., an LAN card, an MODEM, etc. The communication portion 209 performs a communication process via the network, e.g., the Internet, etc.

A driver 210 is also connected to the input/output interface 205 as required. A removable medium 211, e.g., a magnetic disk, an optical disk, a magneto-optical disk, a semiconductor memory, etc., is installed on the driver 210 as required, so that computer program read out from the removable medium is installed into the storage portion 208 as required.

Program can be installed into the computing apparatus from the network, etc., the Internet, etc., or a storage medium, e.g., the removable medium 211, etc.

Those skilled in the art can appreciate that such a storage medium will not be limited to the removable medium 211 illustrated in FIG. 2 in which program is stored and which is distributed separately from the apparatus to provide a user with the program. Examples of the removable medium 211 can include a magnetic disk (including a Floppy Disk (a registered trademark)), an optical disk (including a Compact Disk-Read Only Memory (CD-ROM) and a Digital Versatile Disk (DVD)), a magneto-optical disk (including a Mini Disk (MD) (a registered trademark)) and a semiconductor memory. Alternatively, the storage medium can be an ROM 202, or a hard disk included in the storage portion 208, etc., in which program is stored and which together with the apparatus integrating the same is distributed to a user.

Figure 3:
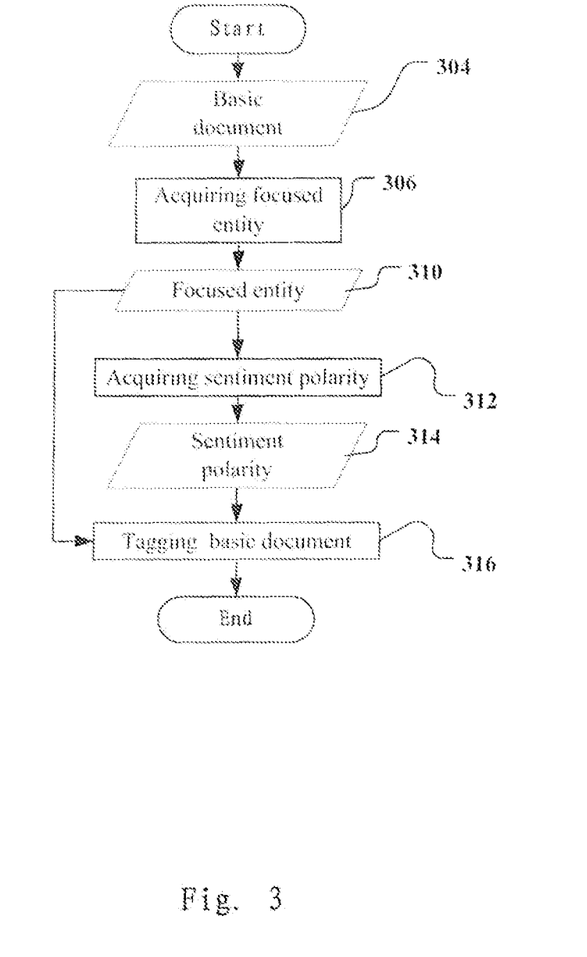
FIG. 3 is a flow chart of an embodiment of a method according to the invention.

In the first embodiment of the present invention, FIG. 3 illustrates a flow chart of an embodiment of a method according to the invention. According to this embodiment, firstly a focused entity 310 relevant to a basic document 304 is acquired from the basic document 304 (the step 306). Then a sentiment polarity 314 of comments on the focused entity 310 is acquired for the acquired focused entity 310 (the step 312). After step 312, a tag for the basic document is generated from the focused entity 310 and the corresponding sentiment polarity 314 (step 316), thereby facilitating knowledge of people about an opinion on the focused entity 310.

The basic document 304 can be an offline or online document in any format, can be a single document or be comprised of more than one document. In the case of a plurality of basic documents, the embodiments of the invention can be realized with respect to the contents of the respective basic documents separately or as a whole. The focused entity 310 means a subject of interest; Depending on different demands and preferences of a user, the focused entity can actually be any entity directly or indirectly relevant to the basic document 304, including an entity included in the basic document 304, an entity deducted from the contents of the basic document 304, an entity that occurs to a user upon reading the basic document 304, an entity included in or deducted from another document relevant to the basic document 304, etc.

On the other hand, the focused entity 310 can be a person (e.g., a public figure, a person involved in an event, etc.), an object (e.g., various commodities, etc.), an attribute of an object (e.g., a function of a product), an event (e.g., a social accident, a topic of interest to the public, etc.), a standpoint, etc. Generally speaking, the focused entity 310 can be any tangible or intangible object of interest.

The focused entity 310 can be acquired in various ways. For example, it can be selected manually by a user from the basic document 304 when the basic document 304 is displayed, can be deducted or derived manually by the user from the basic document and then input into a computing apparatus in which the method according to the embodiment of the present invention is performed, etc. Alternatively, the focused entity 301 can be input from an external method or apparatus, that is, the external process or apparatus can prepare and then provide the focused entity 310 to the process performed according to the embodiment of the present invention.

Alternatively, the focused entity 310 can be acquired in real time in the process performed according to the embodiment of the present invention, and at this time, the step 306 of acquiring the focused entity can be performed using any existing or future technology of extracting an object from a document. For example, a technology of extracting a focused entity is disclosed in "Focused Named Entity Recognition using Machine Learning" by Li Zhang, Yue Pan and Tong Zhang in SIGIR '04, Jul. 25-29, 2004, Sheffield, South Yorkshire, UK.

In the next step 312 of acquiring the sentiment polarity, the sentiment polarity 314 refers to a sentiment of support or not, agreement or not, praise or not, criticism or not, etc., embodied in comments relevant to a focused entity. A sentiment is an activity of subjective consciousness of human, but a sentiment expressed literally by the human being can become an object of a semantic analysis, data mining, etc., that is, a polarity of the sentiment expressed in words (e.g., in a news report, a blog article, a BBS forum thread or reply, etc.) can be recognized, categorized and utilized by means of information processing technology. Generally, the sentiment polarity 314 can be categorized into a positive polarity (or a positive opinion) and a negative polarity (or a negative opinion). Of course, a neutral opinion can also be included. As necessary, even more levels of opinions can be included, e.g., very good, good, moderate, poor, very poor, etc. The number of levels of opinions will not influence the essence of the technology.

In analogy to acquisition of the focused entity 310, the sentiment polarity 314 can also be acquired in various ways. For example, it can be summarized manually by a user from a display of the basic document 304 or a relevant document (e.g., comments) and then input into a computing apparatus in which the method according to the embodiment of the present invention is performed. Alternatively, the sentiment polarity 314 can be input from an external method or apparatus, that is, the external process or apparatus can prepare and then provide the sentiment polarity 314 to the process performed according to the embodiment of the present invention.

Alternatively, the sentiment polarity 314 can be acquired in real time in the process performed according to the embodiment of the present invention, and at this time, the step 312 of acquiring the sentiment polarity can be performed using any existing or future sentiment analysis technology. For example, a sentiment polarity of comments on the acquired focused entity can be acquired for the focused entity in the embodiment of the present invention using the sentiment analysis technologies disclosed in Patent Documents 1 to 6 mentioned in Background of the Invention.

The acquired sentiment polarity can be embodied in various forms. For example, the numbers of positive opinions and of negative opinions and/or their proportions can be presented for the focused entity 310. Alternatively, a vote is taken using the proportions of positive opinions and of negative opinions to derive a final vote conclusion about whether it is a positive or negative opinion with respect to the focused entity 310. For example, if the number of positive opinions among all the opinions exceeds a certain threshold, e.g., 50% (of course, another proportion is also possible), then a sentiment polarity of comments on the focused entity 310 is considered as a positive polarity (that is, the comments are of a positive opinion).

In the next step 316 of tagging the basic document, a tag can be generated on the basic document 304 from the focused entity 310 and the corresponding sentiment polarity 314 using any existing or future document edition technology, that is, the focused entity 310 and the sentiment polarity 314 are labeled in the basic document 314. The tag can be embodied as a text, a pattern, a graph or multimedia.

Figure 4:
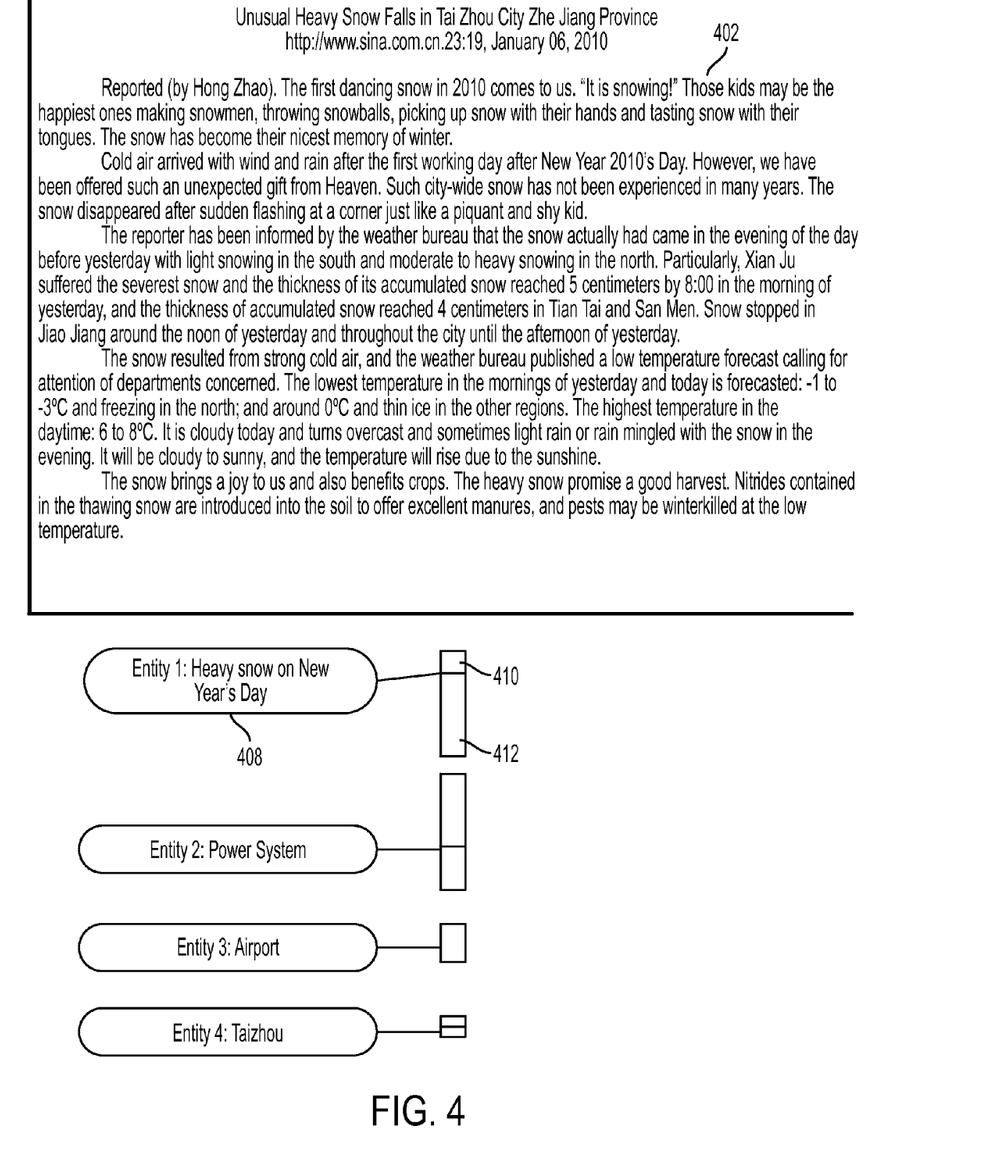
FIG. 4 is an example of a document tagged according to an embodiment of the method of the invention.

FIG. 4 illustrates an example of a document tagged according to an embodiment. As illustrated, an article 402 entitled "Unusual Heavy Snow Falls in Taizhou City, Zhejiang Province" is a basic document (not necessarily the whole article but possibly a segment thereof is illustrated). Extracted focused entities include e.g., "heavy snow on New Year's day" 408, etc., and dark bars 410 and light bars 412 represent respectively positive and negative opinions on the focused entities and their rough numbers. From the tagged document 402, an interested person can know conveniently from the event "unusual heavy snow falls in Taizhou City, Zhejiang Province" comments on "heavy snow on New Year's day", for example.

FIG. 4 illustrates a particular form of a tag, and other forms of tags than the form of a tag illustrated in FIG. 4 can be used. For example, names of the respective entities can be listed directly without tagging them as "entity 1", "entity 2", etc., and a pie chart, a column chart, a statistic graph, etc., can be used instead of the dark and light bars as statistic data, or the statistic data can be directly expressed as numbers. For example, the number of positive opinions is 20 as indicated at the reference number 506 in FIG. 5. In another example, the illustrated tags are concentrated at the end of the basic document as an extension to the document. Alternatively, a focused entity can be circled at its location in the basic document, and a sentiment polarity can be tagged in a tag box (not illustrated) drawing from the location, like a "balloon" typically used in document edition. Of course, it is also possible to not mark the statistic data, but only mark a final vote conclusion (not illustrated) about the focused entity.

Figure 5:
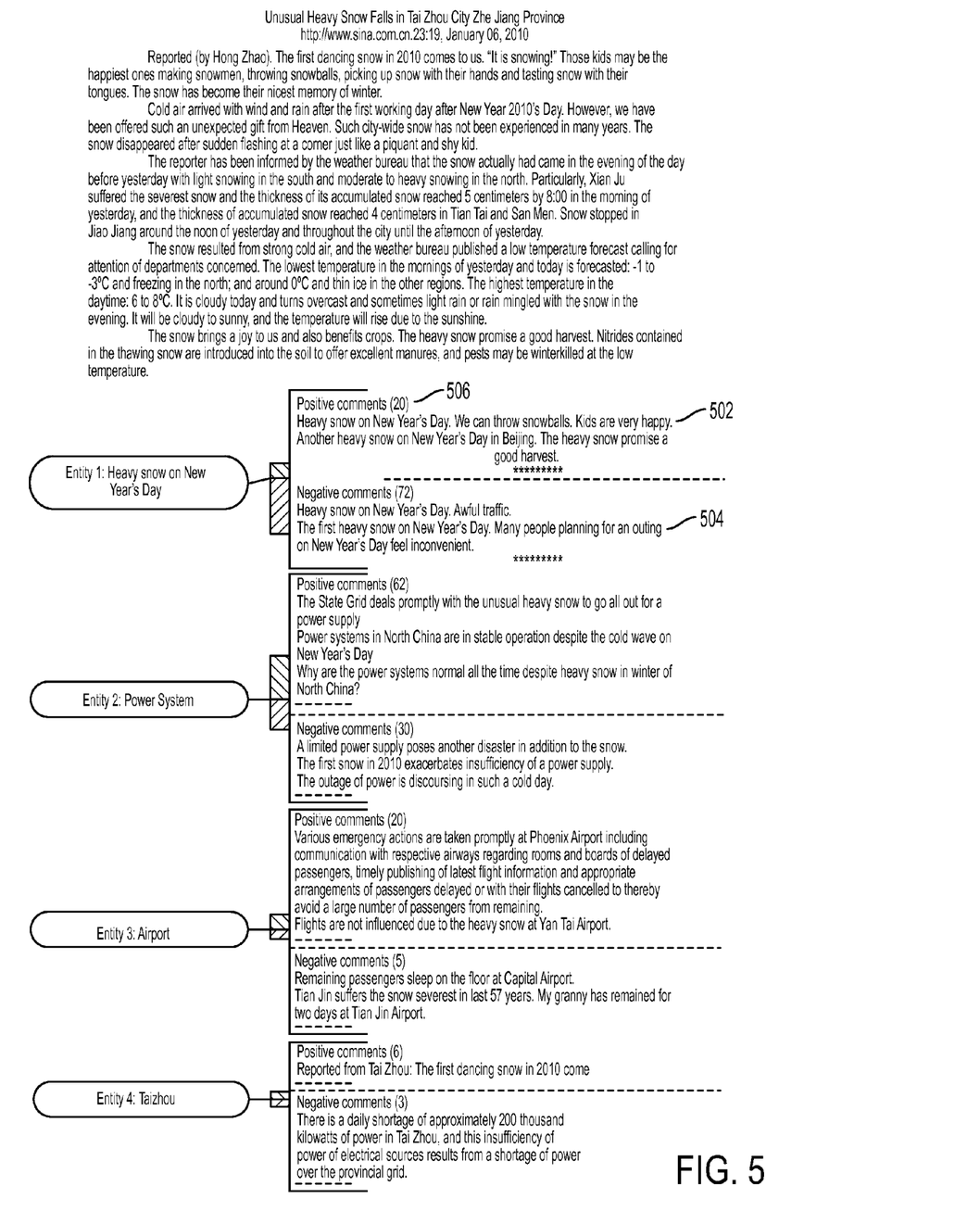
FIG. 5 is another example of a document tagged according to the embodiment of the method of the invention.

Furthermore, since comments on the same focused entity can occur at different locations in the article, such comments can be gathered together to thereby facilitating a reader. Therefore, contents of the comments relevant to the focused entity can be included in the tag. As illustrated in FIG. 5, for example, positive comment contents 502 and negative comment contents 504 for "heavy snow on New Year's Day" are listed respectively.

Figure 6:
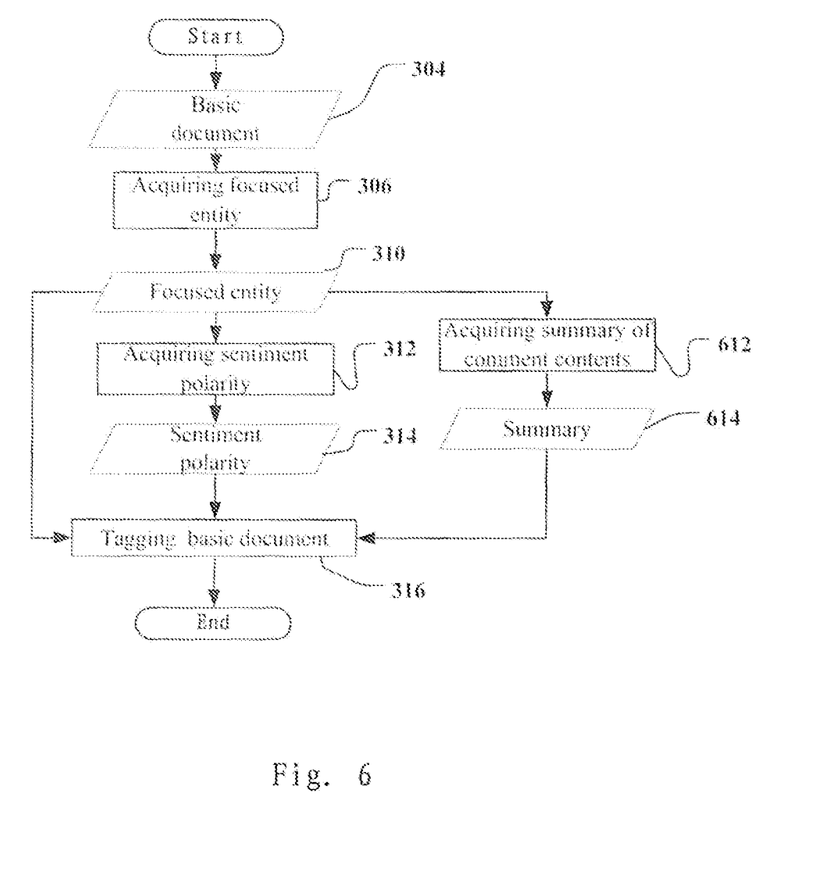
FIG. 6 is a flow chart of another embodiment of the method according to the invention.

Apparently, contents of comments are sometimes lengthy. Therefore as illustrated in FIG. 6, a summary 614 of the comment contents can be acquired using any existing or future technology (the step 612) to thereby replace the comment contents per se and be included in the tag. There are numerous technologies of extracting a summary of all or a part of contents of an article, for example, those in "Opinion Extraction, Summarization and Tracking in News and Blog Corpora" by Lun-Wei Ku, Yu-Ting Liang and Hsin-His Chen in American Association for Artificial Intelligence, 2006 and "Opinion Observer: Analyzing and Comparing Opinions on the Web" by Bing Liu, Minqing Hu and Junsheng Cheng in WWW 2005, May 10-14, 2005, Chiba, Japan.

Figure 7:
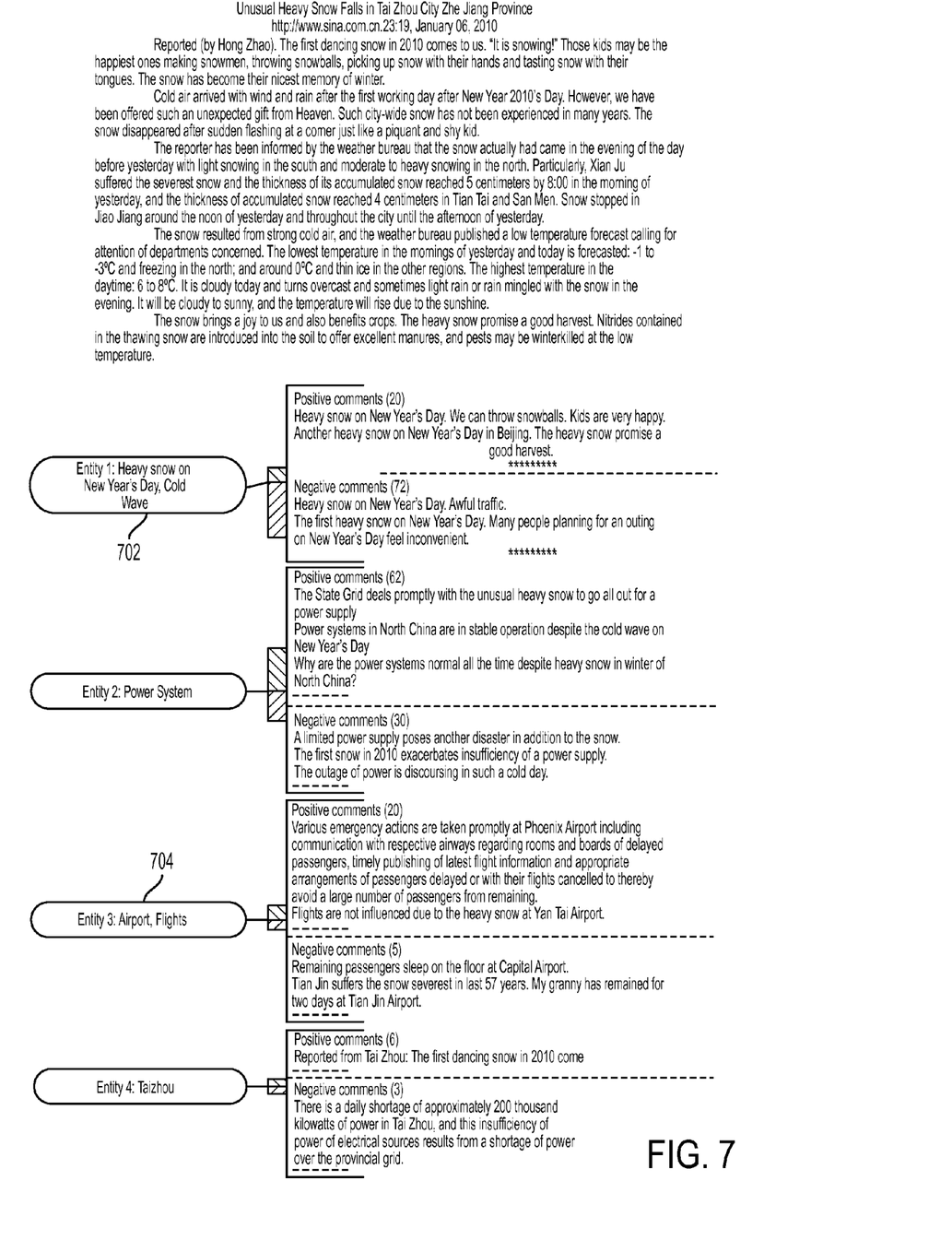
FIG. 7 is another example of a document tagged according to another embodiment of the method of the invention.

The inventors have noticed that some focused entities occurring in a document are synonymous or closely associated. In this case, the synonymous or closely associated focused entities can be combined, and in this respect, the uncombined associated focused entities are referred to sub-focused entities. For example, as illustrated in FIG. 7, sub-focused entities "heavy snow on New Year's Day" and "cold wave" are closely associated and therefore combined into a focused entity "entity 1: heavy snow on New Year's Day and cold wave" 702, and sub-focused entities "airport" and "flight" are closely associated and therefore combined into a focused entity "entity 3: airport and flight" 704.

Sub-focused entities can be combined in various manners. For example, associated entities can be combined manually following the step 306 of acquiring the focused entities. Alternatively in analogy to the step 306 of acquiring the focused entities, they can be combined in a process or apparatus external to the embodiment of the invention and then provided to the process performed according to the embodiment of the invention. Alternatively, they can be combined in the process performed according to the embodiment of the invention, which can be implemented using any existing or future technology.

In the prior art, there are various technologies of analyzing an association between different entities. Generally, associated entities refer to entities which resemble in the syntax or semantic sense and which belong to similar categories. For example, relevant technologies include:

1) Recognition of an alias of an entity is. For example, an alias of Beijing University (Beijing Daxue in Pinyin) is Bei Da. An alias can be recognized in a collinear-over-short-distance statistic method or a rule-based method. For example, a bracketed name can be regarded as an alias. The collinear-over-short-distance statistic method is on such a principle that most of associated words in a sentence or an article occur concurrently in a context, so semantically identical words can be clustered using information of the context, co-linearity, etc. The collinear-over-short-distance statistic method can also be used in combination with the rule-based method.

2) Synonym or synonym extension, and general and specific concepts extension. For example, a general concept "natural disaster" corresponds to specific concepts "cyclone", "tsunami", etc. Such an extension is typically performed using a word table resource. That is, synonyms, corresponding general and specific concepts, etc., are listed in the table of words, and focused entities extracted from a document can be combined if they are in a correspondence relationship. Alternatively, the table of words can be searched directly using an extracted focused entity for other corresponding entities, which if found can be incorporated into a combined focused entities.

3) An automatic clustering analysis made to recognize semantically associated entities. For example, the paper "Product Feature Categorization with Multilevel Latent Semantic Association" by Honglei Guo, Huijia Zhu, Zhili Guo, XiaoXun Zhang and Zhong Su in CIKM '09 Nov. 2-6, 2009, Hong Kong, China discloses that semantically resembling entities are clustered using a topic model.

In second embodiment of the present invention, the inventors have noticed that information included in a basic document tends not to be comprehensive. For example, it is not sufficient for a reader to know comprehensive opinions of the public on something, a general influence of something upon the public, etc. Particularly in a conventional entity extraction technology, only a focused entity involved directly in a basic document can be extracted, but no other actually relevant entity can be derived which has neither been mentioned in and can not be deducted from the basic document, and of course, an opinion (a sentiment polarity) on an omitted entity thus can not be acquired, so no comprehensive knowledge of or opinion on an object or an event involved in the basic document can be acquired. For example, if the contents of the document illustrated in FIG. 4 include all of the contents of the basic document, then only a limited number of positive opinions of the public on "heavy snow on New Year's Day" and "Taizhou" but no traffic condition closely relevant to the weather, etc., can be known from the basic document, so a general social influence of heavy snow on New Year's Day can not be perceived comprehensively only from the tags on the basic document. Therefore, embodiment of the present invention extends the scope of documents from which focused entities are extracted and for which a sentiment polarity is analyzed.

Figure 8:
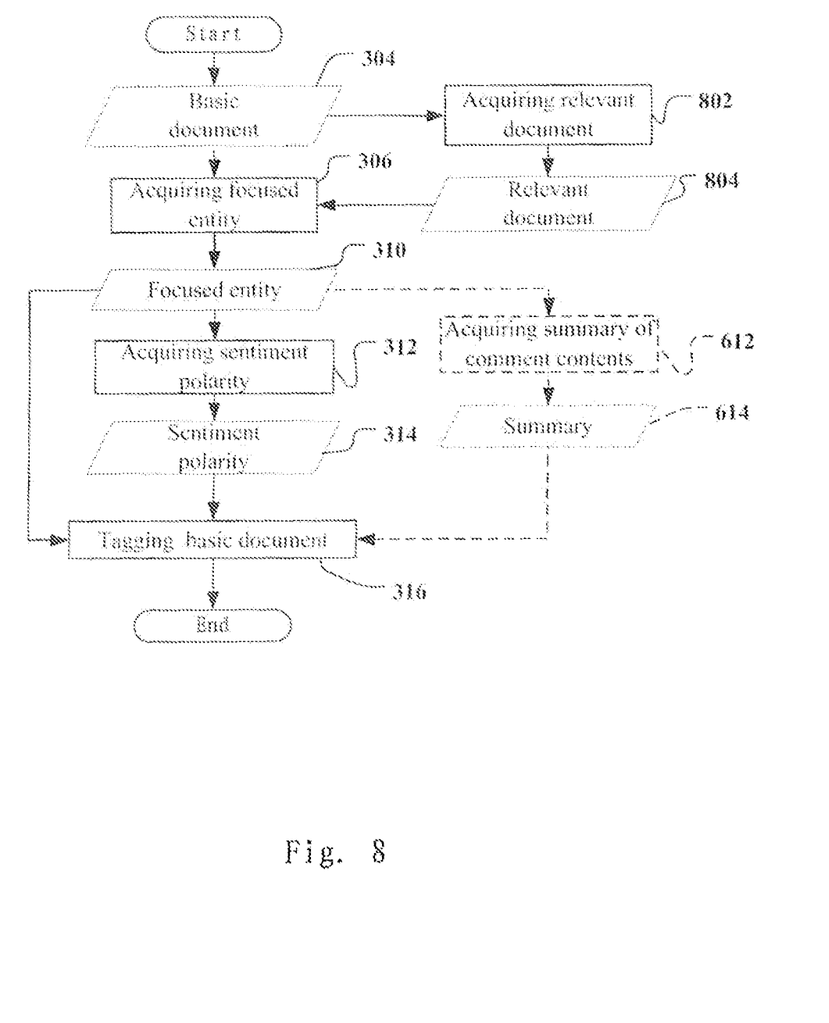
FIG. 8 is a flow chart of a further embodiment of the method according to the invention.

Specifically, as illustrated in FIG. 8, a relevant document 804 can be acquired for a basic document 304 (the step 802), and then a focused entity 310 is acquired from the basic document 304 and the relevant document 804 (the step 306).

Other steps illustrated in FIG. 8 are identical or similar to those described in connection with the first embodiment and therefore denoted by the same reference numerals and a repeated description thereof will be omitted here. The step of acquiring the focused entity 310 from the basic document 304 and the relevant document 804 is substantially the same as the step of acquiring the focused entity 306 in the first embodiment except for the additionally processed relevant document 804, and thus a repeated description thereof will be omitted too.

Furthermore, the step being indicated by the dotted line in FIG. 8 means that the corresponding step is not necessarily required but can or can not be performed as recorded in the description of the first embodiment.

The relevant document 804 can be acquired in various ways. For example, a relevant article can be searched for by a user over the network or in a database using contents of the basic document 304 and then input into a computing apparatus in which the method according to the embodiment of the present invention is performed, etc. Alternatively, the relevant document 804 can be input from an external method or apparatus, that is, the external process or apparatus can prepare and then provide the relevant document 804 to the process performed according to the embodiment of the present invention. For example, a set of documents and a basic document can be provided from the outside, and then focused entities are extracted and sentiment polarities are analyzed and tagged on the basic document 304 in the process according to the embodiment of the present invention.

Alternatively, the relevant document 804 can be acquired in real time in the process according to the embodiment of the present invention, and at this time, the step 802 of acquiring the relevant document can be performed using any existing or future document searching technology.

The embodiment of the present invention provides that the relevant document 804 is acquired using a link relationship between the documents. For example, on a news website a news topic is typically linked to other associated articles; in a blog or a BBS forum there are links to comments or a replies, etc. A document linked with the basic document 804 can be taken as the relevant document. Furthermore, another document in a link relationship with the relevant document can also be taken as a relevant document. That is, the relevant document of the basic document can include both directly and indirectly relevant documents. The number of layers of links can be determined as required for a practical application or pre-determined, e.g., to be three (but not limited thereto).

Figure 9:
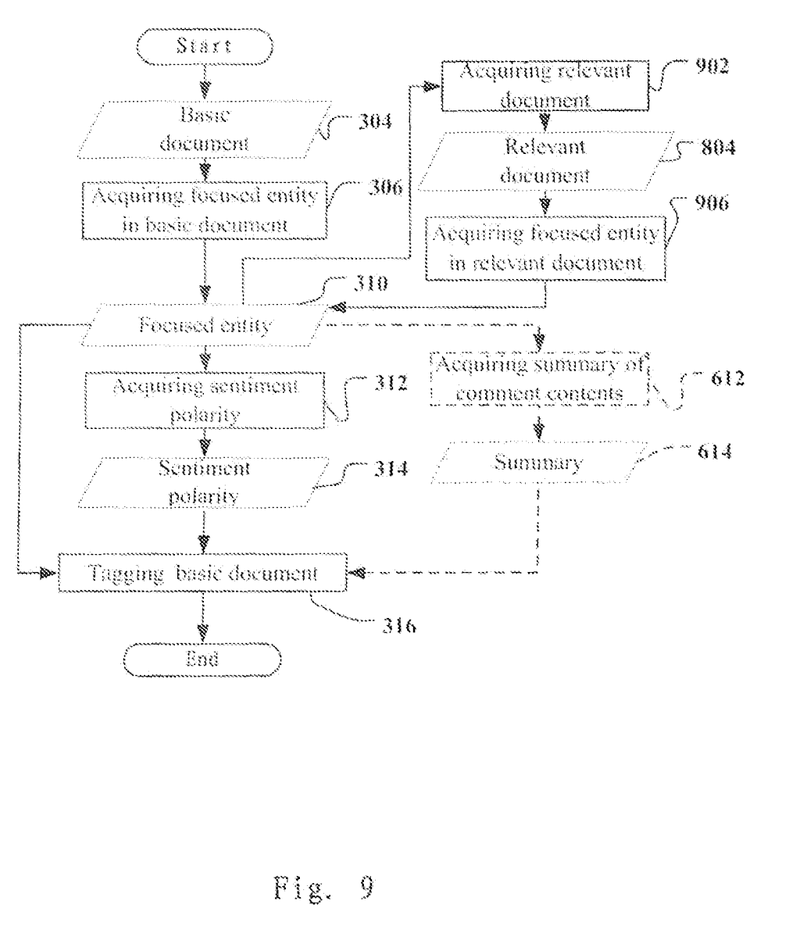
FIG. 9 is a flow chart of a further embodiment of the method according to the invention.

However, sometimes the result of acquiring relevant documents according to link relationship is not so accurate or sufficient. Therefore, the embodiment of the present invention provides that the relevant document 804 can be acquired based on the focused entity 304. For example, as illustrated in FIG. 9, the step 902 of acquiring the relevant document 804 based on the focused entity of the basic document 304 and the step 906 of acquiring focused entities from the relevant document 804 are added on the basis of the first embodiment. For example, the focused entity acquired from the basic document 304 can be used as a search keyword to search over the network or in a database for a document including the keyword as the relevant document 804. To improve efficiency, the number of focused entities of the basic document used as search keywords can be limited, and only those documents with high relevance or only predetermined number of hit documents among search results can be taken as relevant documents. A specific criterion thereof can be determined and adjusted appropriately according to specific application. In analogy to acquisition of a relevant document using a link relationship, more relevant documents can further be searched for again using focused entities acquired from the acquired relevant document, and the number of cycle layers can also be determined as required by a practical application.

Alike, other steps illustrated in FIG. 9 are identical or similar to those described in connection with the first embodiment and therefore denoted by the same reference numerals and a repeated description thereof will be omitted here. Alike, the step being indicated by the dotted line in FIG. 9 means that the corresponding step is not necessarily required but can or can not be performed according to the description of the first embodiment.

In the case of a relevant document is used, if contents of comments or a summary thereof are/is included in a tag on a basic document (as described in the first embodiment), then it is useful to indicate in the tag a source of the focused entity and/or the comment, for example, a source (e.g., a newspaper, a forum, a network address, etc.) can be marked before or after each focused entity and/or contents of each comment. If one source originates a plurality of focused entities and/or contents of comments, then the focused entities and/or the contents of the comments can be categorized per source and their source can be tagged or the contents of the comments can be categorized per both source and sentiment polarity.

Alternatively to a source being literally tagged, a source can be tagged in the form of a link 1002 as illustrated in FIG. 10, so a reader can jump to a relevant document as the source simply by clicking the corresponding link. The link can be positioned over a corresponding focused entity and/or contents of comments as illustrated in FIG. 10 or over the literally tagged source (e.g., a newspaper, a forum, a network address, etc.).

Alternatively, the source can be popped up. As illustrated in FIG. 10, a corresponding source 1004, e.g. a newspaper, a forum, or a network address, is popped up when one moves a computer mouse to a corresponding focused entity and/or corresponding contents of comments, possibly in the form of a plain text or a jumpable-to link.

Figure 11:
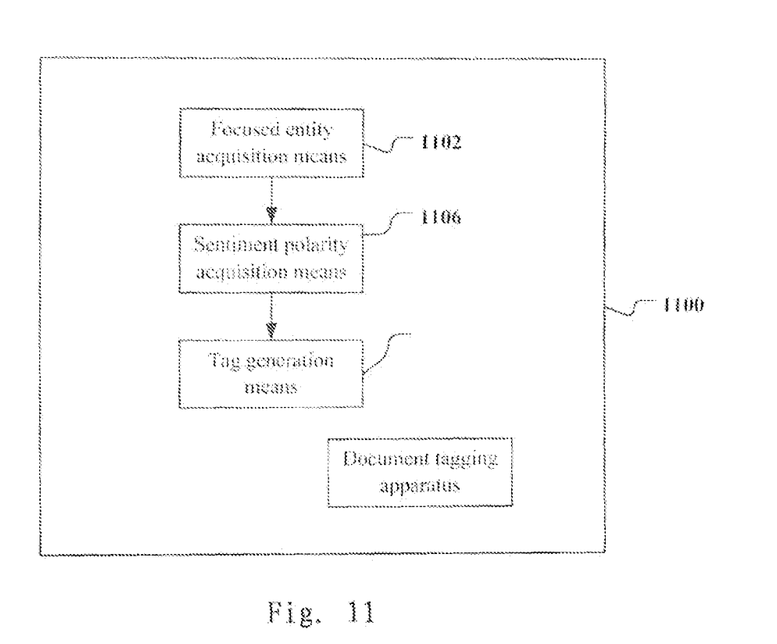
FIG. 11 is a schematic block diagram of an embodiment of an apparatus according to the invention.

In correspondence to the first embodiment, third embodiment of the present invention further provides a document tagging apparatus 1100 which will be described below with reference to the drawings. The document tagging apparatus 1100 is substantially consistent with the method according to the first embodiment and therefore will be briefly described below, and reference can be made to the description of the first embodiment for details of implementations and operations of respective components thereof.

As illustrated in FIG. 11, the document tagging apparatus 1100 according to the embodiment includes: a focused entity acquisition means 1102 configured to acquire a focused entity relevant to a basic document; a sentiment polarity acquisition means 1106 configured to acquire a sentiment polarity of comments on the focused entity; and a tag generation means 1108 configured to generate a tag on the basic document from the focused entity and the corresponding sentiment polarity. The tag can include an identifier of the focused entity and the corresponding sentiment polarity.

Particularly, the sentiment polarity acquisition means 1106 can further be configured to acquire statistic data of the sentiment polarity on the focused entity, and thus the tag can include the statistic data of the sentiment polarity on the relevant focused entity.

Alternatively or additionally, the tag can further include contents of comments relevant to each sentiment polarity.

Figure 12:
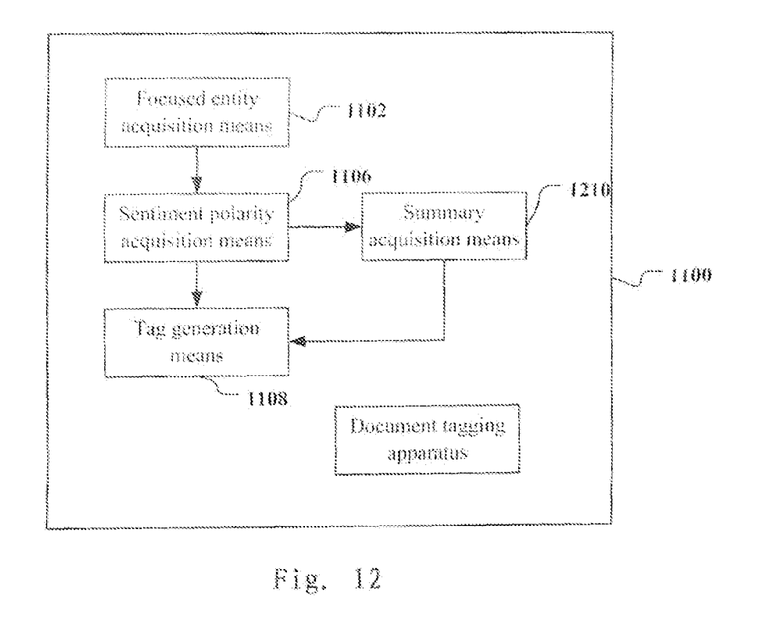
FIG. 12 is a schematic block diagram of another embodiment of the apparatus according to the invention.

Furthermore, as illustrated in FIG. 12, the document tagging apparatus 1100 according to the embodiment of the present invention can further include a summary acquisition means 1210 configured to acquire a summary of contents of the comment relevant to the each sentiment polarity. Thus, the tag can include only the summary of but not the full text of the contents of the comment.

Furthermore, the focused entity acquisition means 1102 can further be configured to combine a plurality of sub-focused entities into a focused entity. Thus, a plurality of synonymic and/or closely associated sub-focused entities can be combined into a focused entity, thereby making the tag of the sentiment polarity of the document more concise and accurate.

It shall be noted that as described in the first embodiment of the present invention, acquisition of the focused entity, acquisition of the sentiment polarity and extraction of the summary can be performed manually or they can be input from the outside or acquired and extracted using any existing or future technology. Therefore, the focused entity acquisition means 1102, the sentiment polarity acquisition means 1106 and the summary acquisition means 1210 can be implemented using any existing or future technology and even can just be means for inputting the focused entity, the sentiment polarity and the summary.

In correspondence to the second embodiment, the fourth embodiment of the present invention further provides a document tagging apparatus 1100 which will be described below with reference to the drawings. The document tagging apparatus 1100 is substantially consistent with the method according to the second embodiment and therefore will be briefly described below, and reference can be made to the description of the second embodiment for details of implementations and operations of respective components thereof. Furthermore, this embodiment is an improvement of the third embodiment, and therefore a repeated description of the components which have been described in the third embodiment will be omitted here. In analogy to the second embodiment, the summary acquisition means 1210 denoted by the dotted line in FIG. 13 and FIG. 14 is not necessarily required but can or can not be arranged as apparent from the description of the first and third embodiments.

Figure 13:
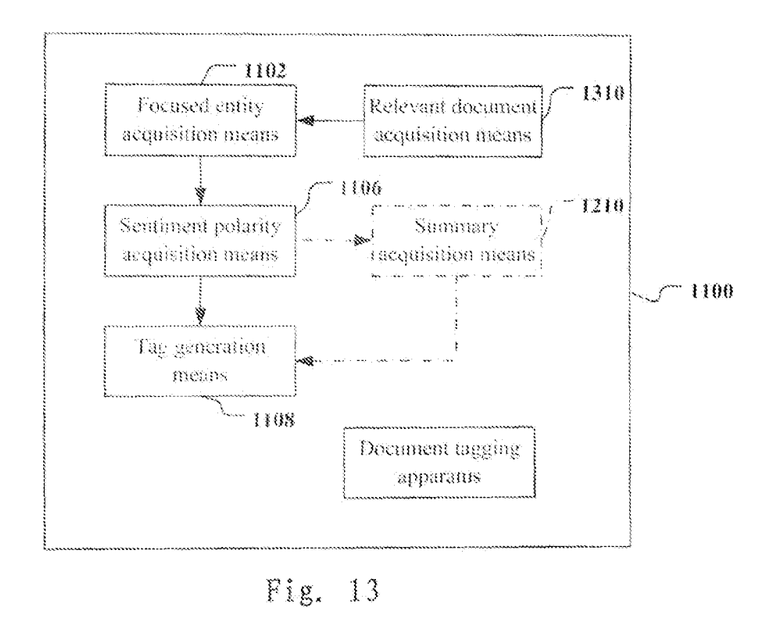
FIG. 13 is a schematic block diagram of another embodiment of the apparatus according to the invention.
Figure 14:
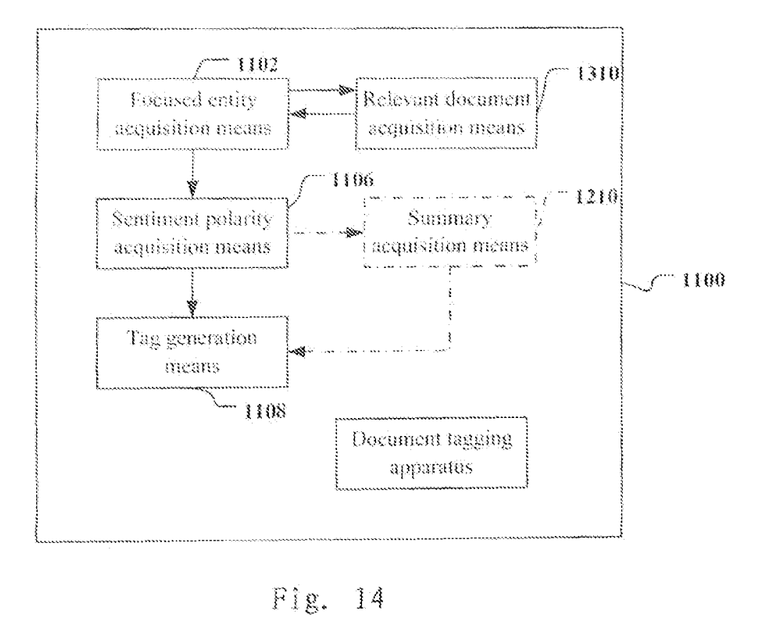
FIG. 14 is a schematic block diagram of another embodiment of the apparatus according to the invention.

Specifically, as illustrated in FIG. 13, a relevant document acquisition means 1310 is added to the document tagging apparatus 1100 according to the third embodiment and configured to acquire a relevant document relevant to the basic document. Accordingly, the focused entity acquisition means 1102 is configured to acquire focused entities in the basic document and the relevant documents. Thus, a scope of the documents can be extended so that focused entities and/or opinions on the focused entities could be acquired more completely.

Correspondingly, the tag can further include a source of the focused entity and/or a source of the comment contents. The source can be in the form of a text or a link which can be popped up. Thus, it can be convenient to know or jump to a source document of the focused entity and/or the comment contents.

The relevant document acquisition means 1310 can be configured to acquire the relevant document using a link relationship between the documents. The number (depth) of layers of link can be determined as required in a practical application.

Furthermore, as illustrated in FIG. 14, the relevant document acquisition means 1310 can further be configured to acquire as the relevant documents other documents relevant to the focused entity in the basic document acquired by the focused entity acquisition means 1102 based upon the focused entity in the basic document. Thus, the focused entity acquisition means 1102 further acquires a focused entity from the relevant document acquired by the relevant document acquisition means 1310, so that the document tagging apparatus 1100 can extend a scope of the documents to thereby acquire focused entities and/or opinions on the focused entities more completely. Similarly, according to the focused entity acquired by the focused entity acquisition means from the relevant document, the relevant document acquisition means 1310 can again acquire and submit more relevant documents to the focused entity acquisition means 1102, which in turn acquires more focused entities. The number of cycles can be determined reasonably according to specific application.

It shall be noted that as described in the second embodiment, acquisition of the focused entity, acquisition of the sentiment polarity, extraction of the summary and acquisition of the relevant document can be performed manually or they can be input from the outside or acquired and extracted using any existing or future technology. Therefore, the focused entity acquisition means 1102, the sentiment polarity acquisition means 1106, the summary acquisition means 1210 and the relevant document acquisition means 1310 can be implemented using any existing or future technology and even can just be means for inputting the focused entity, the sentiment polarity, the summary and the relevant document.

Some embodiments of the invention have been detailed above. As can be appreciated by those ordinarily skilled in the art, all or any of the steps or components of the method and apparatus according to the invention can be implemented in hardware, firmware, software or a combination thereof in any computing apparatus (including a processor, a storage medium, etc.) or a network of computing apparatus by those ordinarily skilled in the art in light of the disclosure of the invention and in conjunction with their general programming skills, and therefore a specific description thereof will be omitted here.

Furthermore, it is apparent that any display apparatus and any input apparatus connected with any computing apparatus and a corresponding interface and control program shall be used for a possible external operation involved in the foregoing description. Briefly speaking, relevant hardware and software in a computer, a computer system or a computer network as well as hardware, firmware, software or a combination thereof for various operations performed in the foregoing method according to the invention will constitute the apparatus according to the invention and the respective constitute components thereof.

Therefore based upon the foregoing understanding, the object of the invention can also be achieved by running a program or a set of programs on any information processing apparatus, which can be a well known general apparatus. Therefore, the object of the invention can also be achieved simply by providing a program product in which program codes for implementing the method or apparatus are included. In other words, both such a program product and a storage medium in which such a program product is stored will also constitute the invention. Apparently, the storage medium can be any type of storage medium known to those skilled in the art or to be developed in the future, including but not limited to a floppy disk, an optical disk, a magnet-optical disk, a memory card, a memory stick, etc.

In the apparatus and method according to the invention, it is apparent that the respective components or steps can be decomposed, combined and/or decomposed and then recombined. These decompositions and/or recombinations shall be regarded as equivalent solutions of the invention.

It shall further be noted that the above series of processing steps can naturally be performed sequentially in the order as described but will not be limited thereto, and some of the steps can be performed concurrently or separately from each other.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

Finally, the term "include", "comprise" or any variant thereof is intended to encompass nonexclusive inclusion so that a process, method, article or apparatus including a series of elements includes not only those elements but also other elements which have not been listed explicitly or an element (s) inherent to the process, method, article or apparatus. Unless further defined, the expression "comprising a(n) . . . " in which an element(s) is(are) defined will not preclude presence of an additional identical element(s) in a process, method, article or apparatus comprising the defined element (s)".

Although the embodiments of the invention and their advantages have been detailed in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalences, and various variations, substitutions and alterations can be made without departing from the spirit and scope of the invention as defined in the appended claims.

What is claimed is:

1. A method of tagging a basic document performed by a computing device including a processor and a memory, comprising:

acquiring a relevant document based on a link relationship between the basic document and the relevant document, the link relationship comprises a predetermined number of link layers;

acquiring a plurality of focused entities relevant to the basic document and the relevant document, the acquiring further comprising manually selecting the plurality of focused entities from the basic document and the relevant document when the basic document or the relevant document are on display;

in response to detecting at least two closely associated entities of the plurality of focused entities in said basic document, combining the at least two closely associated entities to produce a combined entity, wherein a content of the combined entity includes an object of interest from each of the at least two closely associated entities;

acquiring a sentiment polarity of comments on the content of the combined entity;

generating a tag from the combined entity and said corresponding sentiment polarity, and visually labeling the basic document with the tag, wherein the tag displays said combined entity and said corresponding sentiment polarity.

2. The method according to claim 1, wherein said tag comprises an identifier of the least two closely associated entities and statistic data of said sentiment polarity.

3. The method according to claim 2, wherein said tag further comprises comment contents relevant to each said sentiment polarity.

4. The method according to claim 2, further comprising:
acquiring a summary of comment contents relevant to each said sentiment polarity, wherein said tag further comprises a summary of the comment contents.

5. The method according to claim 2, wherein each focused entity is a combination of a plurality of sub-focused entities.

6. The method according to claim 1, wherein said tag is a tag selected from a group comprising a source of one of the at least two closely associated entities, a source of summary of comment contents, and a combination thereof.

7. The method according to claim 6, wherein said source of the one of the at least two closely associated entities is in the form of a link.

8. The method according to claim 1, further comprising:
acquiring said relevant document relevant to said basic document further by:
acquiring the plurality of focused entities in said basic document; and
acquiring said relevant document from the plurality of focused entities.

9. The apparatus according to claim 1, wherein said tag is a tag selected from a group comprising a source of the one of the at least two closely associated entities, a source of summary of comment contents, and a combination thereof.

10. The apparatus according to claim 9, wherein said source of one of the at least two closely associated entities is in the form of a link.

11. The apparatus according to claim 1, wherein said processor device further executes said program code to acquire as the relevant document another document relevant to the plurality of focused entities in said basic document acquired by a focused entity acquisition means based upon the plurality of focused entities in said basic document.

12. The method according to claim 1, wherein the visually labeling of the basic document with the tag includes inserting the tag at the end of the basic document or encircling each of the at least two closely associated entities with the tag.

13. An apparatus for tagging a basic document, comprising:
a bus;
a memory connected to said bus, wherein program code is stored on said memory; and
a processor device connected to the bus, wherein said processor device executes said program code to:
acquire a relevant document based on a link relationship between the basic document and the relevant document, the link relationship comprises a predetermined number of link layers;
acquire a plurality of focused entities relevant to the basic document and the relevant document, wherein the plurality of focused entities are selected from the basic document and the relevant document when the basic document or the relevant document are on display;
in response to detecting at least two closely associated entities of the plurality of focused entities in said basic document, combine the at least two closely associated entities to produce a combined entity, wherein a content of the combined entity includes an object of interest from each of the at least two closely associated entities:
acquire a sentiment polarity of comments on the content of the combined entity;
generating a tag from the combined entity and said corresponding sentiment polarity, and
visually labeling the basic document with the tag, wherein the tag displays said combined entity and said corresponding sentiment polarity.

14. The apparatus according to claim 13, wherein said processor device further executes said program code to acquire statistic data of said corresponding sentiment polarity, and said tag comprises an identifier of the at least two closely associated entities and said statistic data of said sentiment polarity.

15. The apparatus according to claim 14, wherein said tag further comprises comment contents relevant to each said sentiment polarity.

16. The apparatus according to claim 14, wherein said processor device further executes said program code to:
a summary of comment contents relevant to each said sentiment polarity, wherein said tag further comprises said summary of the comment contents.

17. The apparatus according to claim 14, wherein said processor device further executes said program code to combine a plurality of sub-focused entities into each focused entity.

18. The apparatus according to claim 13, wherein the visually labeling of the basic document with the tag includes inserting the tag at the end of the basic document or encircling each of the at least two closely associated entities with the tag.

19. A non-transitory computer readable article of manufacture tangibly embodying computer readable instructions that when executed by a computer cause the computer to perform the method according to claim 1.

* * * * *